(12) United States Patent
Dinan et al.

(10) Patent No.: US 7,199,972 B2
(45) Date of Patent: Apr. 3, 2007

(54) NARROW WRITE HEAD POLE TIP FABRICATED BY SIDEWALL PROCESSING

(75) Inventors: Thomas Edward Dinan, San Jose, CA (US); Richard Hsiao, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 0 days.

(21) Appl. No.: 09/944,648

(22) Filed: Aug. 31, 2001

(65) Prior Publication Data

US 2003/0043504 A1   Mar. 6, 2003

(51) Int. Cl.
    *G11B 5/127*   (2006.01)
(52) U.S. Cl. .................... 360/126; 29/603.14
(58) Field of Classification Search ........... 360/126, 360/317, 122; 29/603.12
    See application file for complete search history.

(56) References Cited

U.S. PATENT DOCUMENTS

| 5,282,308 | A |   | 2/1994  | Chen et al. ........... 29/603.18 |
| 5,285,340 | A |   | 2/1994  | Ju et al. ............... 360/119 |
| 5,652,687 | A |   | 7/1997  | Chen et al. ............ 360/126 |
| 5,774,308 | A | * | 6/1998  | Ohtsuka et al. ......... 360/126 |
| 5,805,391 | A |   | 9/1998  | Chang et al. ........... 360/317 |
| 6,043,960 | A |   | 3/2000  | Chang et al. ........... 360/317 |
| 6,466,416 | B1| * | 10/2002 | Honjo et al. ........... 360/317 |
| 6,525,904 | B1| * | 2/2003  | Sasaki ................. 360/126 |
| 6,538,846 | B1| * | 3/2003  | Sato ................... 360/126 |
| 6,577,475 | B1| * | 6/2003  | Sasaki et al. .......... 360/317 |
| 6,578,252 | B2| * | 6/2003  | Sasaki ................. 29/603.12 |

FOREIGN PATENT DOCUMENTS

| JP |   57078613 A  | 5/1982 |
| JP |   01267812 A  | 1/1989 |
| JP |   03228210 A  | 1/1991 |
| JP | A-2000-207709 | 1/1999 |
| JP |  2000 207709 A2 | 7/2000 |
| JP |  2001 023117 A2 | 1/2001 |
| JP |  2002 175606 A  | 6/2002 |

OTHER PUBLICATIONS

IBM Technical Disclosure Bulletin, vol. 40, No. 04, Apr. 1997, entitled: Sidewall Formation Using Silicon Nitride Mask for Horizontal/Planar Magnetic Heads.
IBM Technical Disclosure Bulletin, vol. 40, No. 04, Apr. 1997, entitled: Sidewall Process for Horizontal/Planar Magnetic Heads.

* cited by examiner

*Primary Examiner*—Tianjie Chen
(74) *Attorney, Agent, or Firm*—Robert O. Guillot; Intellectual Property Law Offices

(57) ABSTRACT

The magnetic head includes a P2 pole tip in which the P2 pole tip material is electroplated upon a sidewall of the P2 pole tip photolithographic trench. To accomplish this, a block of material is deposited upon a write gap layer, such that a generally straight, vertical sidewall of the block of material is disposed at the P2 pole tip location. Thereafter, an electroplating seed layer is deposited upon the sidewall. A P2 pole tip trench is photolithographically fabricated such that the sidewall (with its deposited seed layer) is exposed within the P2 pole tip trench. Thereafter, the P2 pole tip is formed by electroplating pole tip material upon the seed layer and outward from the sidewall within the trench. The width of the P2 pole tip is thus determined by the quantity of pole tip material that is deposited upon the sidewall.

16 Claims, 5 Drawing Sheets

NARROW WRITE HEAD POLE TIP FABRICATED BY SIDEWALL PROCESSING

BACKGROUND OF THE INVENTION

1. Field of the Invention

The present invention relates generally to the fabrication of magnetic heads, and more particularly to the fabrication of a narrow second pole section (P2) for such magnetic heads.

2. Description of the Prior Art

Hard disk drives include one or more magnetic disks upon which data is written by magnetic heads. The ongoing efforts to increase the amount of data stored on the disk necessarily focuses on increasing the areal data storage density of the disk; that is, the number of data bits that are stored within a given area of disk surface.

As is well understood by those skilled in the art, one way to increase the areal data storage density of a hard disk 12 is to increase the number of tracks per inch (TPI) that are written onto the disk surface. To increase the TPI it is necessary to write narrower data tracks, and such narrower data tracks are achieved by decreasing the width of the P2 pole tip, in that the width of the P2 pole tip generally determines the width of the data track that is written by a magnetic head. The standard P2 pole tip fabrication process involves the use of photolithographic techniques to create a narrow P2 pole tip trench, followed by the plating up of the P2 pole tip from the bottom of the trench to its top. In this photolithographic fabrication process, the width of the P2 pole tip corresponds to the width of the P2 pole tip trench. As is understood by those skilled in the art, limitations exist in these photolithographic techniques for fabricating P2 pole tips, particularly where high aspect ratio P2 pole tip plating trenches are required, such that the width of such P2 pole tips will generally reach a minimum limit of approximately 500 nm. Thus, where it is desired to create P2 pole tips having a pole tip width that is less than approximately 500 nm a different photolithographic fabrication method is desirable, and the present invention is such a method for fabricating narrow P2 pole tips in which the electroplating of the P2 pole tip is conducted principally from the sidewall of the P2 pole tip trench rather than its bottom.

SUMMARY OF THE INVENTION

The magnetic head of the hard disk drive of the present invention includes a P2 pole tip that is fabricated utilizing photolithographic and electroplating techniques in which the P2 pole tip material is electroplated upon a sidewall of the P2 pole tip photolithographic trench. To accomplish this, a block of material is deposited upon a write gap layer, such that a generally straight, vertical sidewall of the block of material is disposed at the P2 pole tip location. Thereafter, an electroplating seed layer is deposited upon the sidewall. Utilizing photolithographic techniques, a P2 pole tip trench is fabricated such that the sidewall (with its deposited seed layer) is exposed within the P2 pole tip trench. Thereafter, the P2 pole tip is formed by electroplating pole tip material upon the seed layer. It is therefore significant that the P2 pole tip is fabricated by electroplating material outward from the sidewall within the trench, rather than from the bottom of the trench as is known in the prior art. As a result, the width of the P2 pole tip is determined by the quantity of pole tip material that is deposited upon the sidewall, rather than by the width of the P2 pole tip trench.

Following the fabrication of the P2 pole tip of the present invention, an induction coil is fabricated utilizing standard photolithographic techniques and a third pole section (P3) is fabricated over the induction coil in magnetic interconnection with the P2 pole tip. The P2 pole tip of the present invention therefore includes a side portion that is composed of the seed layer that was deposited upon the sidewall of the block of material, and a second portion that is composed of the pole tip material that was electroplated onto the seed layer. The width of the P2 pole tip is therefore determined by electroplating parameters, rather than by the width of the photolithographic P2 pole tip trench in which the P2 pole tip is fabricated.

It is an advantage of the magnetic head of the present invention that it includes a P2 pole tip having a narrow width.

It is another advantage of the magnetic head of the present invention that it includes a narrow P2 pole tip for writing narrow data tracks to a magnetic hard disk.

It is an advantage of the hard disk drive of the present invention that it includes magnetic hard disks having an increase areal data storage density.

It is another advantage of the hard disk drive of the present invention that it includes a magnetic head of the present invention that includes a P2 pole tip having a narrow width.

It is a further advantage of the hard disk drive of the present invention that it includes a magnetic head of the present invention that includes a narrow P2 pole tip for writing narrow data tracks to a magnetic hard disk.

It is an advantage of the method for fabricating a magnetic head of the present invention that a high aspect ratio P2 pole tip is more easily fabricated.

It is another advantage of the method for fabricating a magnetic head of the present invention that it includes a narrow P2 pole tip that is fabricated utilizing photolithographic and electroplating techniques in which the P2 pole tip is plated from a side of the P2 pole tip trench.

These and other features and advantages of the present invention will no doubt become apparent to those skilled in the art having read the following detailed description which makes reference to the several figures of the drawings.

IN THE DRAWINGS

DETAILED DESCRIPTION OF THE PREFERRED EMBODIMENTS

Figure 1:
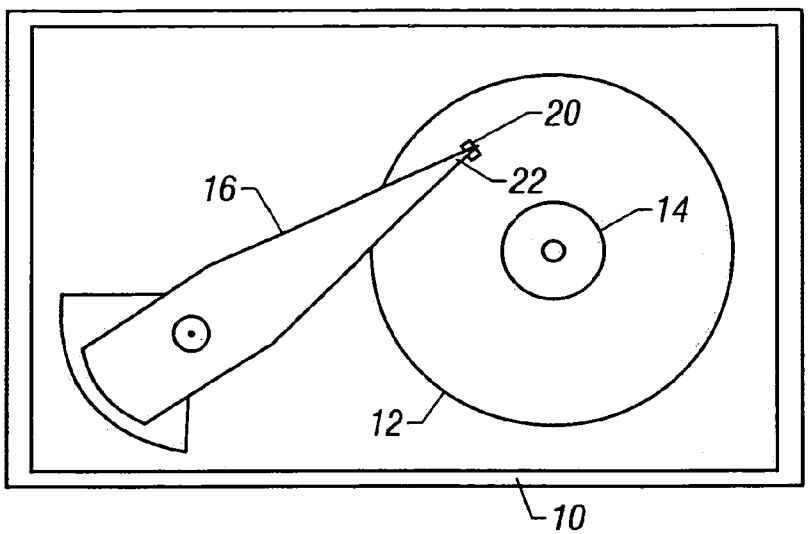
FIG. 1 is a top plan view depicting a hard disk drive of the present invention including a magnetic head of the present invention therewithin.

FIG. 1 is a top plan view that depicts significant components of a hard disk drive which includes the magnetic head of the present invention. The hard disk drive 10 includes a magnetic media hard disk 12 that is rotatably mounted upon a motorized spindle 14. An actuator arm 16 is pivotally mounted within the hard disk drive 10 with a magnetic head 20 of the present invention disposed upon a distal end 22 of the actuator arm 16. A typical hard disk drive 10 may include a plurality of disks that are rotatably mounted upon the spindle 14 and a plurality of actuator arms 16 having a magnetic head 20 mounted upon the distal end 22 of the actuator arms. As is well known to those skilled in the art, when the hard disk drive 10 is operated, the hard disk 12 rotates upon the spindle 14 and the magnetic head 20 acts as an air bearing slider that is adapted for flying above the surface of the rotating disk. The slider includes a substrate base upon which the various structures that form the magnetic head are fabricated. Such heads are fabricated in large quantities upon a wafer substrate and subsequently sliced into discrete magnetic heads 20.

As is well known to those skilled in the art typical magnetic head fabrication steps generally include the deposition and patterning of various thin film layers to fabricate a read head, followed by the further deposition and patterning of various thin film layers upon the read head to fabricate a write head. The present invention relates to the fabrication of a write head, and therefore a magnetic head of the present invention may include most, if not all, of the various read head configurations as are generally known to those skilled in the art. Thus, a detailed description of the fabrication process of the present invention can commence at a point in the magnetic head fabrication process that a read head element has been fabricated upon a wafer substrate, followed by the fabrication of a P1 magnetic pole and a write gap layer. Such structures are well known to those skilled in the art, and a detailed description thereof is not required to present a detailed description of the present invention.

Figure 2:
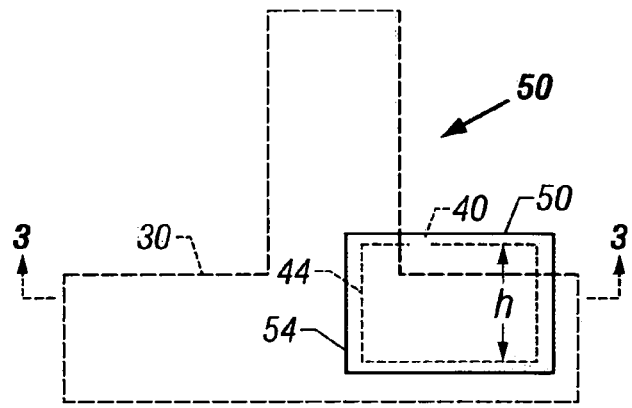
FIG. 2 is a top plan view of a portion of a wafer substrate depicting a first step in the fabrication of the magnetic head of the present invention.
Figure 3:
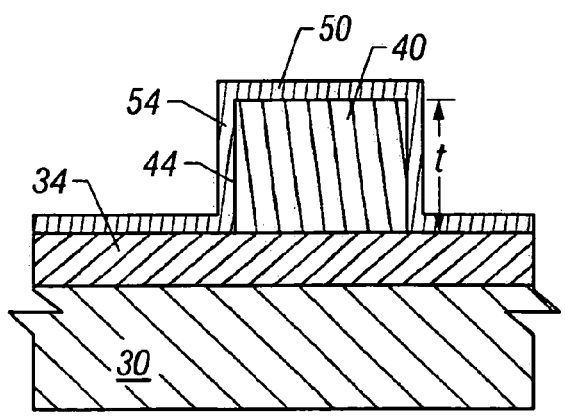
FIG. 3 is a side cross-sectional view of the device depicted in FIG. 2, taken along lines 3—3 of FIG. 2.

FIGS. 2 and 3 depict first steps in the fabrication of a P2 pole tip of the magnetic head 20 of the present invention, wherein FIG. 2 is a top plan view and FIG. 3 is a side cross-sectional view taken along lines 3—3 of FIG. 2. As depicted in FIGS. 2 and 3, the fabrication process of a magnetic head upon a wafer substrate surface has been conducted to the point of the fabrication of a first pole (P1) 30 upon an insulation layer (not shown) followed by the deposition of a write gap layer 34 upon the P1 pole 30. As indicated above, the fabrication of magnetic heads to this point is well known to those skilled in the art. Following the deposition of the write gap layer 34, a block of nonconductive material 40 is fabricated upon the write gap layer. The block of material 40 can be fabricated in a variety of ways, such as by depositing a photoresist and photolithographically patterning and removing portions of the photoresist such that the block of material remains. The significant features of the block of material are that its height h should correspond to the height of the desired P2 pole tip, that its thickness t corresponds to the desired thickness of the P2 pole tip, that the block 40 be positioned such that its sidewall 44 be accurately located above the P1 pole at the desired location of the P2 pole tip, and that the sidewall 44 be smooth and vertical. Thereafter, as is depicted in FIGS. 2 and 3, a seed layer 50 for the electroplating of the P2 pole tip is deposited across the surface of the wafer, significantly including a seed layer portion 54 that is deposited to cover the sidewall 44. The seed layer 50 is preferably composed of the same material as the pole tip, such as NiFe, and is deposited using a typical sputter deposition technique.

Figure 5:
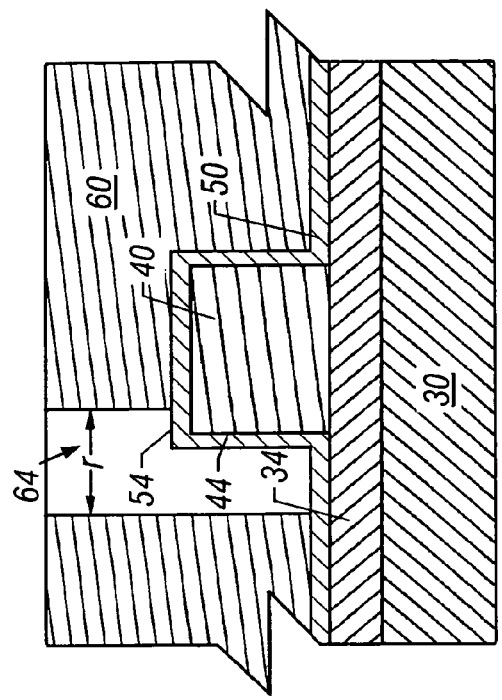
FIG. 5 is a side cross-sectional view of the fabrication step depicted in FIG. 4, generally taken along lines 5—5 of FIG. 4.
Figure 4:
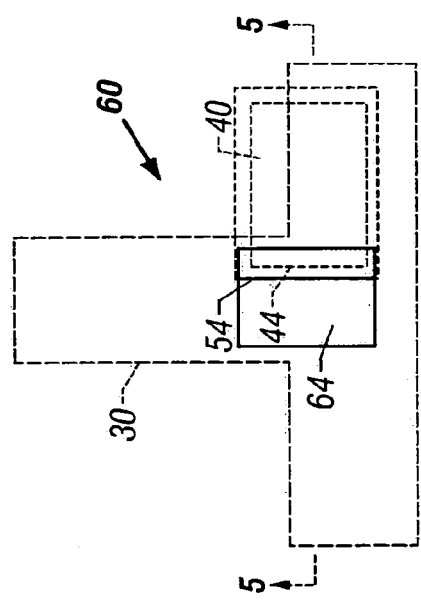
FIG. 4 is a top plan view of a further step in fabricating the magnetic head of the present invention.

A further step in the fabrication of the magnetic head of the present invention is depicted in FIGS. 4 and 5, wherein FIG. 4 is a top plan view and FIG. 5 is a side cross-sectional view taken along lines 5—5 of FIG. 4. As depicted in FIGS. 4 and 5, following the deposition of the seed layer, a photoresist layer 60 is deposited on top of the seed layer 50 and across the surface of the wafer. Thereafter, utilizing photolithographic techniques, a P2 pole tip trench 64 is photolithographically formed in the photoresist layer 60. Significantly, the P2 pole tip trench is located to expose the seed layer 54 deposited upon the sidewall 44. The width r of the P2 pole tip trench 64 is chosen to be sufficiently wide to allow unimpeded electroplating of the P2 pole tip within the trench 64 as is next described with the aid of FIGS. 6 and 7, wherein FIG. 6 is a top plan view of the electroplating step and FIG. 7 is a side cross-sectional view taken along lines 7—7 of FIG. 6.

Figure 7:
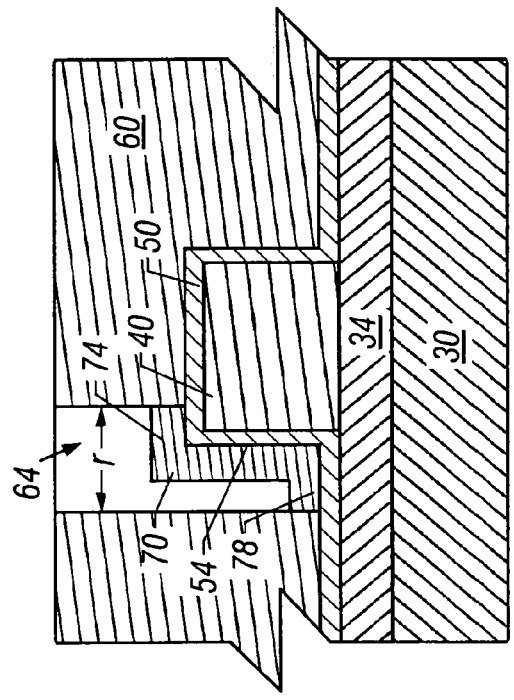
FIG. 7 is a side elevational view of the fabrication step depicted in FIG. 6 taken along lines 7—7 of FIG. 6.
Figure 6:
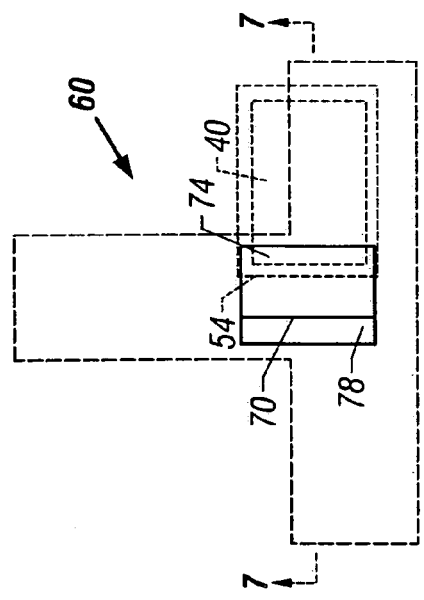
FIG. 6 is a top plan view depicting a further fabrication step of the magnetic head of the present invention.

As depicted in FIGS. 6 and 7, the P2 pole tip material 70 is next electroplated onto the exposed seed layer 50 utilizing standard electroplating techniques as are known to those skilled in the art. It is significant that the P2 pole tip material 70 is electroplated outward from the seed layer portion 54 deposited upon the sidewall 44. That is, the critical width dimension of the P2 pole tip is now determined by the electroplating parameters related to the thickness of the electroplated layer as is further described hereinbelow. Thus the width of the P2 pole tip is not determined by the width of the P2 pole tip trench, as is done in the prior art. As a result, the prior art problems associated with limits upon the aspect ratio of the P2 pole tip trench in the photolithographic process are no longer significant.

Figure 8:
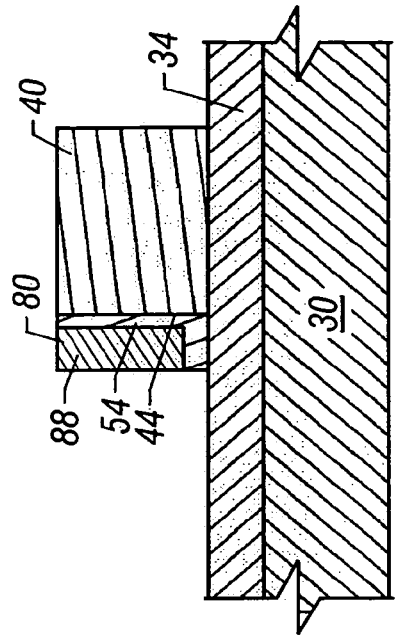
FIG. 8 is a top plan view of a further fabrication step of the magnetic head of the present invention.
Figure 9:
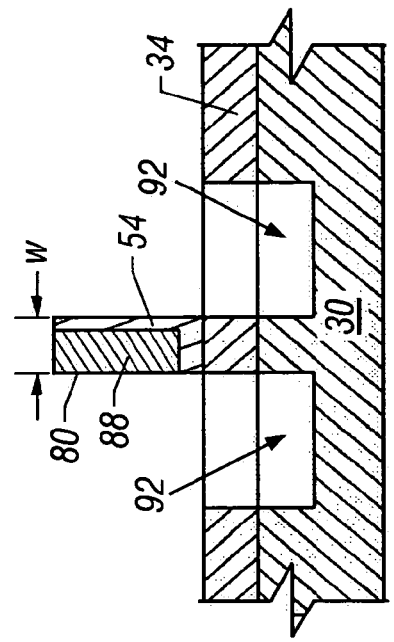
FIG. 9 is a side cross-sectional view of the fabrication step depicted in FIG. 8 taken along lines 9—9 of FIG. 8.
Figure 10:
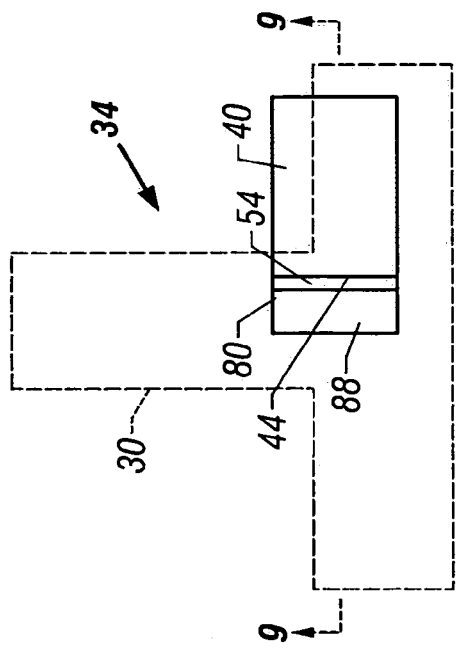
FIG. 10 is a top plan view of a further fabrication step of the magnetic head of the present invention.
Figure 11:
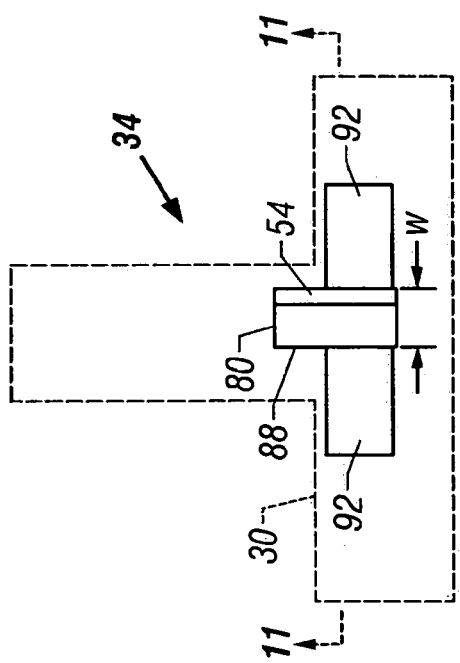
FIG. 11 is a side cross-sectional view of the fabrication step depicted in FIG. 10 taken along lines 11—11 of FIG. 10.

Following the electroplating step, the photoresist 60 is removed, preferably using a wet chemical process, and FIG. 8 is a top plan view depicting the device following photoresist removal and FIG. 9 is a side cross-sectional view taken along lines 9—9 of FIG. 8 that likewise depicts the device following the removal of the photoresist. In a following step, as depicted in FIGS. 8 and 9 the seed layer 50 is removed preferably utilizing an ion beam milling step, typically utilizing argon, as is known to those skilled in the art. FIG. 10 is a top plan view of the device following the removal of the seed layer and FIG. 11 is a side cross-sectional view taken along lines 11—11 of FIG. 10, depicting the device following the removal of the seed layer in the ion milling step. With reference to FIGS. 8, 9, 10 and 11, and as can be particularly seen by comparing FIGS. 9 and 11, the ion milling step is conducted for a sufficient time period to remove the upper, overlaid portion 74 of the electroplated pole tip material and the lower overlaid portion 78 of the P2 pole tip material, such that the remaining portion of the P2 pole tip 80 includes portions of the seed layer 54 deposited upon the sidewall 44 and the P2 pole tip material 88 that has been electroplated onto the seed layer 54. Thereafter, as depicted in FIGS. 10 and 11, the resist block 40 is removed in a further wet chemical process, such that only the P2 pole tip structure 80 remains on the write gap surface 34. It can now be clearly seen that the width W of the P2 pole tip 80 is comprised of the thickness of the seed layer 54 deposited upon the sidewall 44 plus the thickness of the pole tip material 88 electroplated onto the sidewall seed layer 54. Furthermore, as indicated above, the width W of the P2 pole tip has been determined in the electroplating process by selection of appropriate electroplating process parameters rather than by the width of the P2 pole tip plating trench 64.

With the P2 pole tip 80 fabricated on the wafer surface, as depicted in FIGS. 10 and 11, a P1 notching process can now be advantageously conducted. As will be understood by those skilled in the art, a patterned ion etching mask is fabricated upon the wafer substrate such that the P2 pole tip 80 and portions of the write gap layer adjacent thereto are exposed to an ion milling beam. As depicted in FIGS. 10 and 11, the ion milling is conducted to remove portions of the write gap layer 34 adjacent to the P2 pole tip 80 and to mill a notch 92 into the P1 pole 30. As is known to those skilled in the art, P1 pole notching advantageously reduces side writing effects of a magnetic head. Where P1 pole notching is not desired, the block of material 40 can be allowed to remain on the write gap layer 34 to support the P2 pole tip 80, and the fabrication of the induction coil (as is next described) can be commenced.

Figure 12:
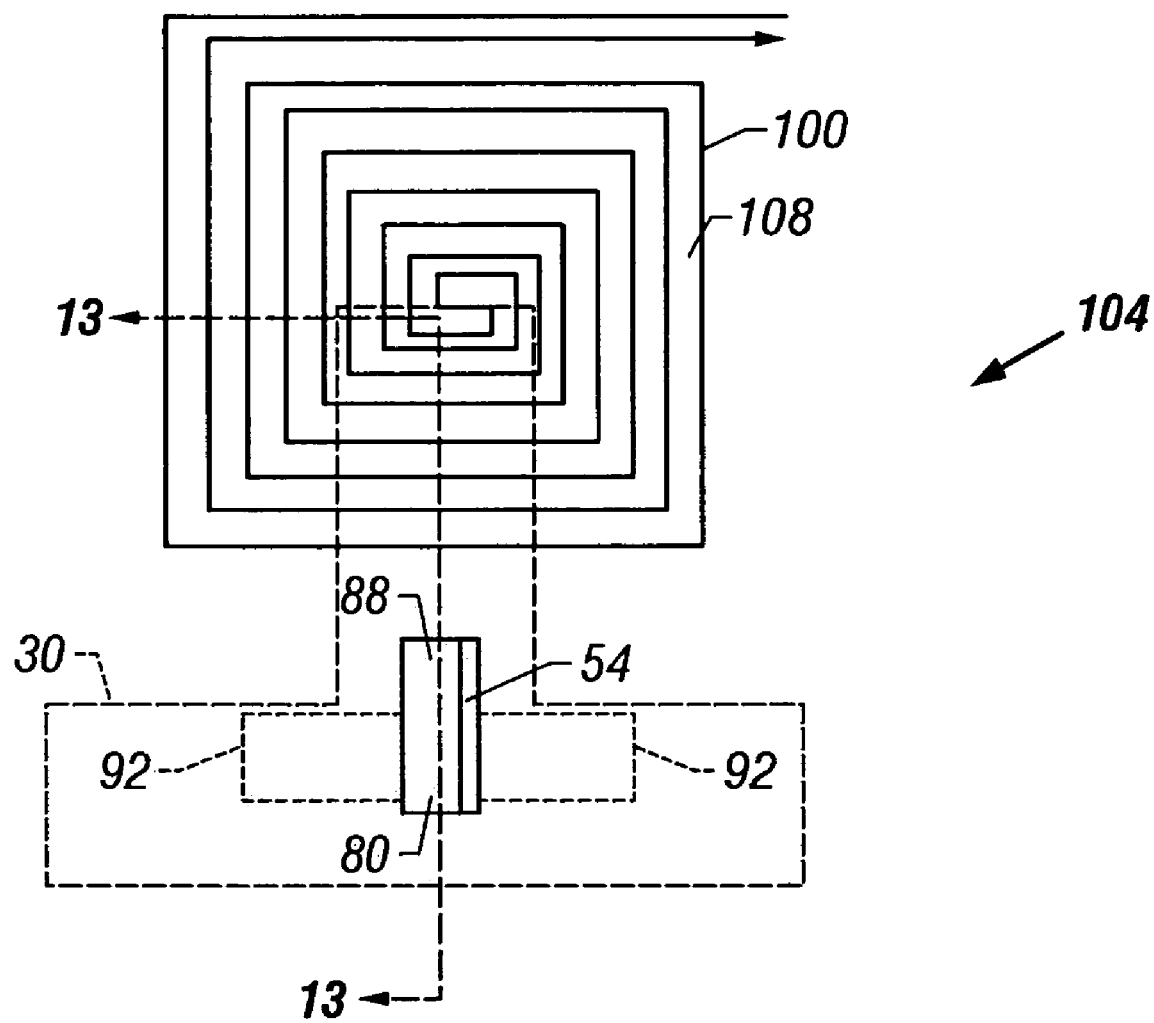
FIG. 12 is a top plan view of another fabrication step of the magnetic head of the present invention.
Figure 13:
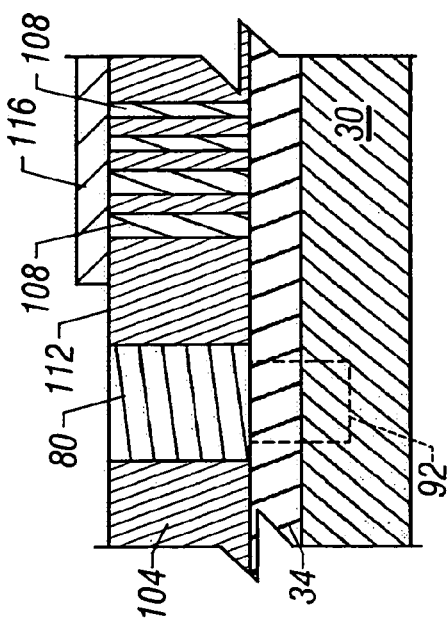
FIG. 13 is a side cross-sectional view of the fabrication step depicted in FIG. 12, taken along lines 13—13 of FIG. 12.
Figure 14:
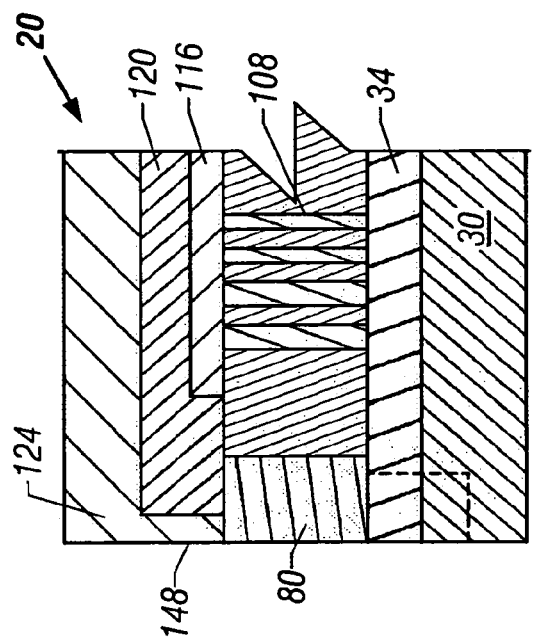
FIG. 14 is a side cross-sectional view depicting a further fabrication step of the magnetic head of the present invention taken along lines 13—13 of FIG. 12.
Figure 15:
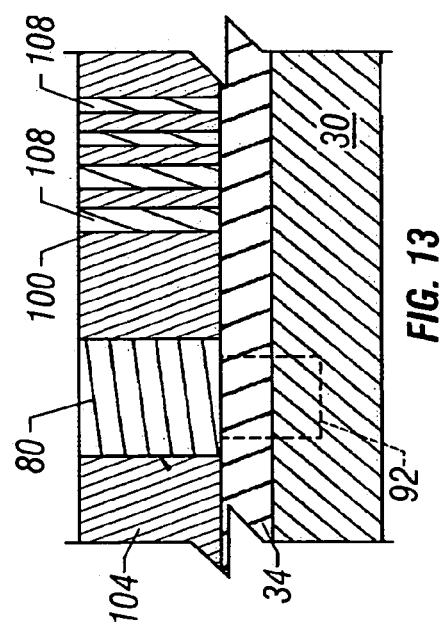
FIG. 15 is a side cross-sectional view depicting still a further fabrication step of the magnetic head of the present invention taken along lines 13—13 of FIG. 12.
Figure 16:
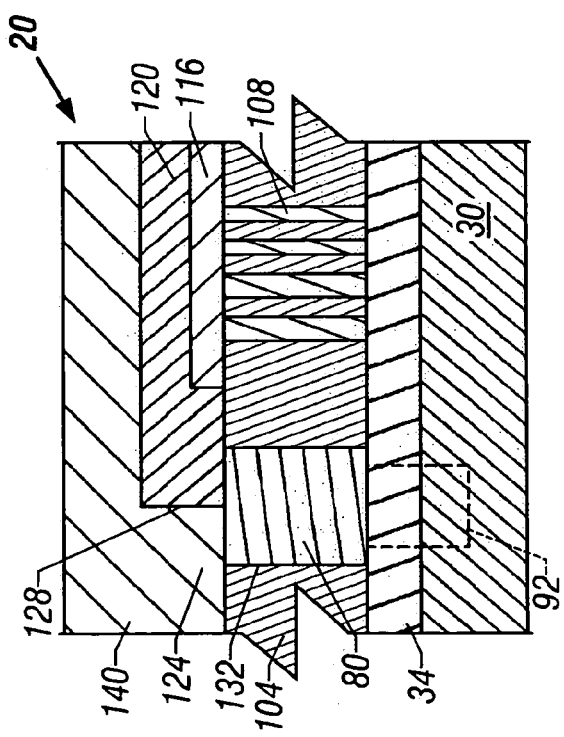
FIG. 16 is a side cross-sectional view depicting yet another fabrication step of the magnetic head of the present invention taken along lines 13—13 of FIG. 12.

As is next depicted in FIGS. 12 through 16, further fabrication steps, as are known to those skilled in the art, are next conducted to complete the fabrication of the magnetic head. Thus, as depicted in FIGS. 12 and 13, wherein FIG. 12 is a top plan view of the head, and FIG. 13 is a side cross-sectional view taken along lines 13—13 of FIG. 12, an induction coil is fabricated upon the wafer surface by photolithographic techniques to create an induction coil trench 100 within an insulation layer 104, followed by electroplating techniques to electroplate the induction coil 108, typically composed of copper, into the induction coil trench 100. Therefore, as depicted in FIG. 12, the induction coil trench is located immediately above the previously fabricated P2 pole tip 80. Alternatively, as is known to those skilled in the art, the induction coil can be fabricated utilizing a suitable dielectric material layer and a reactive ion etching process to create the induction coil trench, followed by the electroplating of the induction coil therewithin. As is next depicted in FIG. 14, a chemical mechanical polishing (CMP) step is conducted to remove any excess induction coil material and to achieve a planar surface 112 upon the wafer. Thereafter, a patterned insulation layer 116 is deposited on top of the induction coil. Significantly, the insulation layer 116 is not deposited upon the top surface of the P2 pole tip 80. As is next depicted in FIG. 15, a further magnetic pole piece 120 (sometimes referred to as a P2 pole yoke or a P3 pole) is fabricated upon the surface of the insulation layer and in magnetic connection with the P2 pole tip 80. The P3 pole 120 is preferably fabricated utilizing photolithographic techniques and electroplating techniques as are well known to those skilled in the art. As depicted in FIG. 15, the P3 pole is preferably fabricated upon the P2 pole tip, such that a gap 124 is provided between the end surface 128 of the P3 pole and the end surface 132 of the P2 pole tip 80. When the wafer level fabrication steps are completed, the wafer is sliced to create rows of magnetic heads. As depicted in FIG. 16, the air bearing surface (ABS) 148 is then fabricated, such that the gap 124 remains. Thereafter, further magnetic head fabrication steps are conducted, as are well known to those skilled in the art, and encapsulation layer 140 is ultimately fabricated upon the device. Further fabrication steps as are well known to those skilled in the art are then undertaken to complete the fabrication of the magnetic head 20 of the present invention.

It is therefore to be understood that a significant feature of the present invention is that the width W of the P2 pole tip 80 is determined in the electroplating process steps by the deposition of P2 pole tip material 88 upon the sidewall seed layer 54. Thus, through the present invention, a P2 pole tip 80 is fabricated wherein the width W is determined by the thickness of the sidewall seed layer 54 plus the thickness of the electroplated material 88 layer thereon. For example, a P2 pole tip 80 of the present invention may be fabricated wherein the sidewall seed layer thickness is approximately 50 Å to 500 Å and the electroplated material thickness is approximately 100 Å to 5000 Å, such that the P2 pole tip width W is approximately 150 Å to 5500 Å. In the preferred embodiment the seed layer thickness is approximately 250 Å and the electroplated material thickness is approximately 1500 Å, such that the width W of the P2 pole tip is approximately 1750 Å. The thickness dimension t of the P2 pole tip 80 is controlled by the thickness t of the deposited sidewall, less material removed from the top of the P2 pole tip during P1 pole notching, if conducted. Thus, as will be understood by those skilled in the art, the width W of the P2 pole tip 80 of the present invention is now within the control of the magnetic head electroplating step, and not controlled by the photolithographic aspect ratio problems encountered in the prior art. Thus the prior art P2 pole tip fabrication problems associated with the aspect ratio of the photolithographically created P2 pole tip trench are overcome.

While the present invention has been shown and described with regard to certain preferred embodiments, it will be understood that those skilled in the art will no doubt develop certain alterations and modifications and form and detail. It is therefore intended that the following claims cover all such alterations and modifications that nevertheless include the true spirit and scope of the present invention.

What we claim is:

1. A magnetic head comprising:
   a substrate;
   a read head being fabricated upon said substrate;
   a P1 pole being fabricated upon said read head;
   a write gap layer being fabricated upon said P1 pole;
   a P2 pole tip fabricated upon of the write gap layer, wherein the P2 pole tip consists of a first sidewall portion, which is formed from a seed layer, and a second portion, which is composed of a pole tip material, and wherein the P2 pole tip has a thickness dimension t, and a base having width dimension W;
   and wherein said seed layer is comprised of an integrally formed layer of seed layer material that forms said base of said P2 pole tip and said first sidewall portion of said P2 pole tip that extends throughout said thickness t of said P2 pole tip.

2. A magnetic head as described in claim 1 wherein said pole tip material that comprises said second portion of said P2 pole tip is disposed upon said seed layer material that forms said first sidewall portion of said P2 pole tip.

3. A magnetic head as described in claim 1 wherein said seed layer material is formed with a thickness of approximately 50 Å to approximately 500 Å, and said pole tip material is formed with a thickness of approximately 100 Å to approximately 5000 Å.

4. A magnetic head as described in claim 3 wherein said seed layer material thickness is approximately 250 Å and said pole tip material thickness is approximately 1500 Å.

5. A magnetic head as described in claim 3 wherein said seed layer material is comprised of deposited NiFe and said pole tip material is comprised of electroplated NiFe.

6. A hard disk drive comprising:
   at least one hard disk being fabricated for rotary motion upon a disk drive;
   at least one magnetic head adapted to fly over said hard disk for writing data on said hard disk, said magnetic head including:
   a substrate;
   a read head being fabricated upon said substrate;
   a P1 pole being fabricated upon said read head;
   a write gap layer being fabricated upon said P1 pole;
   a P2 pole tip fabricated upon of the write gap layer, wherein said P2 pole tip consists a first sidewall portion, which is formed from a seed layer, and a second portion, which is composed of a pole tip material, and wherein the P2 pole tip has a thickness dimension t, and a base having a width dimension W;
   and wherein said seed layer is comprised of an intergrally formed layer of seed layer material that forms said base of said P2 pole tip and said first sidewall portion of said P2 pole tip that extends throughout said thickness t of said P2 pole tip.

7. A hard disk drive as described in claim 6 wherein said pole tip material that comprises said second portion of said P2 pole tip disposed upon said seed layer material that forms said first sidewall portion of said P2 pole tip.

8. A hard disk drive as described in claim 6 wherein said seed layer material is formed with a thickness of approximately 50 Å to approximately 500 Å, and said pole tip material is formed with a thickness of approximately 100 Å to approximately 5000 Å.

9. A hard disk drive as described in claim 8 wherein said seed layer material thickness is approximately 250 Å and said pole tip material thickness is approximately 1500 Å.

10. A hard disk drive as described in claim 8 wherein said seed layer material is comprised of deposited NiFe and said pole tip material is comprised of electroplated NiFe.

11. A method for head comprising:
    a substrate;
    a read head being fabricated upon said substrate;
    a P1 pole being fabricated upon said read head;
    a write gap layer being fabricated upon said P1 pole;
    a P2 pole tip being fabricated upon portions of said write gap layer, wherein said P2 pole tip includes a base surface layer that is disposed upon said write gap layer and a first sidewall surface layer that is disposed generally perpendicularly to said base surface layer, and wherein said base surface layer and said first sidewall surface layer are comprised of an integrally formed layer of P2 pole tip seed layer material;
    and wherein said P2 pole tip includes pole tip material portion, and wherein said P2 pole tip includes a second sidewall surface layer that is disposed opposite to said first sidewall surface layer, and wherein said second sidewall surface layer is comprised of said non-seed layer material.

12. A magnetic head as described in claim 11 wherein said base surface layer defines a width W of said P2 pole tip and said first sidewall layer defines a thickness t of said P2 pole tip.

13. A magnetic head as described in claim 12, wherein said pole tip material portion is disposed in part upon said first sidewall surface seed layer material.

14. A magnetic head as described in claim 13 wherein said seed layer material is formed with a thickness of approximately 50 Å to approximately 500 Å, and said pole tip material is formed with a thickness of approximately 100 Å to approximately 5000 Å.

15. A magnetic head as described in claim 13 wherein said seed layer material thickness is approximately 250 Å and said pole tip material thickness is approximately 1500 Å.

16. A magnetic head as described in claim 13 wherein said seed layer material is comprised of deposited NiFe and said pole tip material is comprised of electroplated NiFe.

* * * * *